June 3, 1947.                J. H. CUMPSTON                2,421,600
                                   HOE
                            Filed Nov. 15, 1944
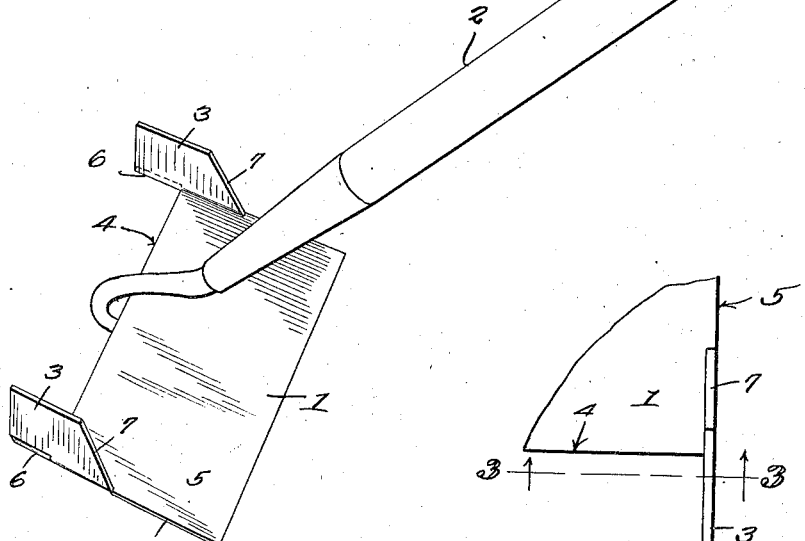
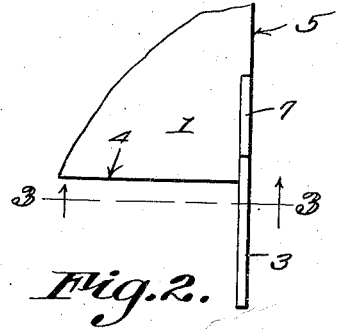
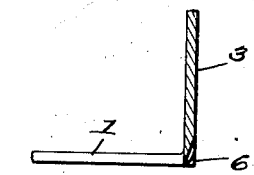
J. H. Cumpston
INVENTOR.
BY *Knowles*
ATTORNEYS.

Patented June 3, 1947

2,421,600

UNITED STATES PATENT OFFICE 2,421,600

HOE

James H. Cumpston, Corsicana, Tex.

Application November 15, 1944, Serial No. 563,501

1 Claim. (Cl. 97—66)

This invention relates to hoes and, while designed primarily for chopping cotton, it can be used for most of the purposes for which hand hoes commonly are employed.

The principal object of the invention is to provide a hoe having means whereby cuts can be made by inexperienced persons close to the plants without injuring them, the cutting action being effected by means of a thrusting action and being designed to supplement the usual chopping action performed in the usual way as with an ordinary hoe.

It is well known to those schooled in the art that, when chopping cotton and other plants in rows, it is difficult to remove the weeds and other growth which are between and close to the plants. This is due to the fact that the hoes are so large as to make it almost impossible to cut close to the plants without damaging them, this being particularly true where the work is done by inexperienced persons. An object of the present invention is to provide a hoe which can be used in the usual manner and which can also be used for the purpose of effecting supplemental cutting actions close to the plant without any great danger of harming the plant.

Another object is to provide a hoe of this character which is simple and inexpensive in construction and can be operated readily.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred forms of the invention have been shown.

In said drawing

Figure 1 is a perspective view of a hoe having the present improvements combined therewith.

Figure 2 is a top plan view of one of the corner portions of the hoe when positioned with the side blades extended upwardly and backwardly therefrom.

Figure 3 is a section on line 3—3 Figure 2.

Referring to the figures by characters of reference I designates a hoe blade proportioned for use in the customary way when chopping cotton and for other purposes. To this hoe is connected an elongated handle 2.

In the structure shown in Figures 1, 2 and 3 the hoe is provided at its upper corners with supplemental blades 3 which extend from the front face of the hoe blades at that side beyond which the handle is located and which also extends backwardly beyond the rear edge 4 of the hoe blade.

The supplemental blades are parallel and are perpendicular to the hoe blade I and the outer sides of these supplemental blades are flush with the side edges 5 of the blade I. The edge of each blade 3, projecting beyond the rear edge 4 and substantially aligned with the corresponding edge 3, is sharpened, as shown at 6. The forward or lower edges of the supplemental blades are preferably inclined downwardly toward the hoe blade I as shown at 7 and are positioned laterally and inwardly from the adjacent edges 5.

In using the hoe for chopping between the cotton plants in a row, it is handled in the same way as it would be ordinarily for the purpose of cutting away the greater portion of vegetation appearing between the plants but it is not used for cutting away vegetation close to the plant. The user gives the hoe a one quarter turn either to the right or to the left as is found most convenient and places the cutting edge 6 of the lowermost supplemental blade 3 against the vegetation to be cut away and then thrusts against the hoe. This results in cutting away the vegetation to be removed and obviously the operation is performed without danger of injuring the adjacent plants. As the supplemental blades have their outer faces flush with the side edges of the hoe blade, they will not scar or otherwise injure plants when the hoe is used close to them prior to bringing the supplemental blades into action.

What is claimed is:

A hoe including a blade, a handle connected thereto, supplemental parallel blades perpendicular to the side portions of the blade and extending along parallel lines beyond the top edge of the hoe blade, each supplemental blade having a cutting edge alined with one of the side edges of the hoe blade and located beyond the top edge of the hoe blade, said supplemental blades being integral with the hoe blade and inset in the hoe blade with their outer side faces flush with the corresponding side edges of the hoe blade.

JAMES H. CUMPSTON.

REFERENCES CITED

The following references are of record in the file of this patent:

UNITED STATES PATENTS

| Number | Name | Date |
|---|---|---|
| D. 34,966 | Maurer | Aug. 20, 1901 |
| 892,607 | Williams | July 7, 1908 |
| 878,920 | Williams | Feb. 11, 1908 |
| 908,266 | Jackson | Dec. 29, 1908 |